United States Patent [19]

Rice et al.

[11] Patent Number: 4,824,656
[45] Date of Patent: Apr. 25, 1989

[54] METHOD OF RECOVERING SULFUR FROM SOLID CATALYSTS

[75] Inventors: David A. Rice, Northport; Alexander May, Tuscaloosa, both of Ala.

[73] Assignee: The United States of America as represented by the Secretary of the Interior, Washington, D.C.

[21] Appl. No.: 68,083

[22] Filed: Jun. 29, 1987

[51] Int. Cl.$^4$ .................. C01B 17/027; B01J 38/66
[52] U.S. Cl. ........................ 423/578 A; 423/578 R; 502/26; 502/517
[58] Field of Search ............... 423/578 A; 578 R, 571; 502/26, 517

[56] References Cited

FOREIGN PATENT DOCUMENTS 52-7396  1/1977  Japan ........................ 502/26
174143   1/1922  United Kingdom ......... 423/578 A

*Primary Examiner*—Robert L. Stoll
*Assistant Examiner*—Adriana L. Eng
*Attorney, Agent, or Firm*—E. Philip Koltos

[57] ABSTRACT

A method for recovering sulfur from a solid sulfur-containing catalyst is disclosed which comprises contacting the catalyst with liquid anhydrous ammonia in order to leach the sulfur out of the catalyst, and form an ammonia-sulfur solution. The sulfur is recovered by separating the ammonia from the solution, preferably by evaporation. The catalyst used in this method is also rendered suitable for reuse. The principal utility of the invention is in the ultimate conversion of phosphogypsum, produced primarily in the fertilizer industry, into sulfur so that it can be recycled back into the industry.

9 Claims, No Drawings

METHOD OF RECOVERING SULFUR FROM SOLID CATALYSTS

FIELD OF THE INVENTION

The invention relates generally to a method of recovering sulfur from a solid catalyst, and in particular, to a method of dissolving a sulfur-containing solid catalyst in a liquid ammonia solution and separating the ammonia therefrom in order to recover the elemental sulfur.

BACKGROUND OF THE INVENTION

In the fertilizer industry, it is of extreme economic importance to convert gypsum or phosphogypsum into elemental sulfur in order to recycle this product back into the industry. Substantial quantities of gypsum, or calcium sulfate dihydrate, are formed during the production of fertilizer, and if not recycled can pile up quickly, presenting a health or aesthetic hazard to the environment. In the reconversion of phosphogypsum back to sulfur, it would also be beneficial if the catalyst and extractant used in the reaction could be recovered and recycled, as well.

The prior art discloses other attempts to recover sulfur from gypsum. In U.S. Pat. No. 4,520,002 (Willis, Jr.), a method is disclosed by which sulfur values present in gypsum are recovered as $SO_2$ with the concurrent production of lime. This method is characterized by dehydrating the gypsum, vaporizing the sulfur, then superheating the sulfur in a confined space at temperatures of at least 1270° F. In U.S. Pat. No. 3,607,036 (Foeckling et al.) there is disclosed a method of recovering sulfur from gypsum in a two-stage reduction process which involves fluidizing the components at temperatures in the range of about 600° to 900° C. A further attempt is described in U.S. Pat. No. 4,503,018 (Gardner et al.), in which there is disclosed a method of desulfurizing phosphogypsum which involves mixing it with coal, pelletizing the mixture, then heating to evolve sulfur and/or sulfur dioxide. All of these above methods require very high temperature and none of them disclose recovery of the catalyst used in the removal of the sulfur.

Other methods observed in the prior art involve the recovery of sulfur or sulfur compounds from gas streams using nitrogen or ammonium compounds. In U.S. Pat. No. 3,260,035 (Wheelock et al.) a method of recovering sulfur dioxide from calcium sulfate is disclosed in which a stream of nitrogen is passed over gypsum and heated to temperatures around 2200° F. Additionally, Kohl and Riesenfeld (*Gas Purification*, 4th Ed., Gulf Publishing Co., Houston, pg. 442 (1985)) describe a method of treating gas streams containing hydrogen sulfide in which sulfur is removed from a catalyst by extraction with ammonium sulfide, which produced an ammonium polysulfide solution. In this latter case, this solution had to be further treated to release elemental sulfur and to recover ammonium sulfide for recycle.

At present, there are no known methods or devices for commercially leaching sulfur from catalysts to produce a sulfur end product. It would therefore be highly desirable to develop a method by which sulfur could be recovered from phosphogypsum in such a manner as to render the catalyst suitable for reuse. It would also be desirable to find an extractant for the sulfur which would be similarly reusable, yet safe, ecomonical, and environmentally acceptable as well.

SUMMARY OF THE INVENTION

It has been discovered that elemental sulfur can be recovered from a sulfur-containing solid catalyst by dissolving the catalyst in liquid anhydrous ammonia. According to the method of the present invention, the sulfur-containing catalyst is dissolved in a liquid ammonia solution, and the catalyst is then separated from the sulfur and ammonia. Finally, by evaporating the sulfur/ammonia solution, the sulfur product can be obtained. In this process, elemental sulfur is recovered, and the catalyst and ammonia can both be reused. An additional advantage is obtained in that such a process can be carried out without the need for extremely high tempratures as required in most prior art methods involving recovery of sulfur from gypsum.

DETAILED DESCRIPTION OF THE PREFERRED EMBODIMENTS

According to the present invention, there is provided a method for recovering sulfur from a solid sulfur-containing catalyst which comprises dissolving the catalyst in liquid ammonia to form an ammonia/sulfur solution, separating out the remaining desulfurized solid catalyst from the solution, and removing the ammonia from the solution, preferably by evaporation, to leave the sulfur product. The principle utitlity of this invention will be in the conversion of phosphogypsum, primarily produced by the fertilizer industry, to elemental sulfur so that it can be recycled back into the industry. In general, phosphogypsum, or calcium sulfate dihydrate, is broken down by drying, heating with coal, coke or carbon monoxide to produce calcium sulfide and carbon dioxide. The calcium sulfide is converted into ammonium sulfide and/or ammonium bisulfide, which in turn is oxidized to sulfur using a suitable solid catalyst. The sulfur forms in situ on the catalyst, and must be extracted if a sulfur end-product is to be produced. The present invention provides a method by which this sulfur can be removed from the catalyst in a form suitable for producing an elemental sulfur end-product, and by which the catalyst can be rendered suitable for reuse as well. In addition, the liquid ammonia used in the present invention can also be rendered suitable for reuse.

The first step of the present invention is carried out by contacting the solid sulfur-laden catalyst, such as activated carbon, with a solution of liquid anhydrous ammonia so that the sulfur in the catalyst dissolves and forms an ammonia-sulfur solution. Although sulfur is highly soluble in ammonia (30–40 wt. pct.), there are still several conditions which must be met in order to carry out the dissolution. It is necessary that the temperature for the dissolution step be greater than −11.5° C. in order for rhombic sulfur to initially dissolve. Once dissolved, it will remain in solution when the temperature is reduced to below −11.5° C. However, at the boiling point of liquid ammonia, −33° C., the rate of dissolution of rhombic sulfur is nil. Thus, dissolution must be carried out under elevated pressures and at temperatures above −11.5° C. Because at present the exact sulfur species that occur on the carbon surface are unknown, it is unclear what the precise optimal leaching temperature will be in this process. From experimental results, it appears that the preferred conditions will be temperatures in the range of from about −11.5°

C. to about 40° C., and pressures from about 40 psi to about 250 psi. It also appears that by adjusting temperature and pressure, a greater range of acceptable conditions can be obtained. It would seem possible to accomplish the dissolution step at temperatures which range from about −78° C. to about 132° C., and at pressures ranging from about 1 to 1640 psi.

For optimal extraction of sulfur in the dissolution step, it is preferred that an excess of $NH_3$ be provided, and an amount equal to several volumes of catalyst may be required. It is particuly preferred that the conditions for carrying out the dissolution comprise a temperature of about −11.5° C., a pressure of about 40 psi, and an amount of $NH_3$ which equals about 1.8–2.0 lbs per lb of sulfur.

After the dissolution step has occurred, the leached solid catalyst remains in the solution, which has now become an ammonia-sulfur solution. The solid catalyst can be separated from the solution by a conventional filtration process. When the dissolution is carried out at low temperatures in a pipe reactor having a discharge valve, the reactor is positioned so that by opening the valve, the ammonia/sulfur liquid can be collected, and the catalyst remains in the reactor. This catalyst, having been leached of sulfur by the ammonia, can now be reused in the oxidation of sulfur.

Once the sulfur-laden ammonia solution is collected, the ammonia can be removed in order to obtain the elemental sulfur product. Most preferably, the ammonia is allowed to evaporate, leaving the solid sulfur product behind. This evaporation can occur under ambient conditions, though conventional means for aiding evaporation can also be employed. Yields of over 95 percent recovery of sulfur are possible through the present method.

In an alternative method of the present invention, it is possible to separate out the ammonia from the sulfur without evaporation so that the ammonia can be recovered along with the sulfur. This method comprises leaching the sulfur from the catalyst material at low temperatures of from around −11.5° C. to around 10° C., and at pressures of from about 40 to 100 psi. After leaching the sulfur from the catalyst by contacting with liquid ammonia, the catalyst is removed from the solution. At this stage the sulfur/ammonia solution is heated to about 100° C., the level at which sulfur solubility in ammonia approximates zero. In an enclosed reactor, this heating step raises the pressure to about 900 psi. Under these conditions, sulfur comes out of solution and can be filtered out of the reactor, leaving the ammonia. The ammonia can then be recycled back into the desulfurization process and reused.

It is also possible to employ the method of the present invention in order to extract sulfur from solid materials other than catalysts such as activated carbon. It is possible to perform the extraction on materials such as lead sulfide that have been oxidized to produce elemental sulfur, or any mixture of materials containing elemental sulfur.

In the laboratory, the method of the present invention was tested using activated carbon as the solid catalyst. The activated carbon was loaded with sulfur by oxidation with an ammonium bisulfide reagent. The total recoverable amount of sulfur in the activated carbon was about 13 percent.

To carry out the test, sixty grams of activated carbon (136 cc) was placed in a stainless steel pipe reactor. The reactor was then pre-chilled to −50° C. in the acetone/dry ice bath for several minutes. The reactor was then opened and 250 mL of liquid $NH_3$ was added. The reactor was closed, placed in an ice-water bath for 20 minutes and was shaken vigorously every 5 minutes. At the end of the leach the reactor was again chilled to −50° C., and the sulfur-containing ammonia solution was discharged into a 250 mL volumetric flask and weighed. The reactor was rechilled to −50° C. and 250 mL of liquid $NH_3$ was added and the carbon was re-leached for another 20 minutes in the water bath. At the end of this second leach, the second sulfur-containing ammonia solution was collected, and a third re-leaching was carried out using the same procedure. Each of the three sulfur/ammonia solutions was allowed to evaporate and the amount of sulfur contained in each evaporite was determined by carbon disulfide extraction. Also, the ammonia gas produced during evaporation of the first sulfur-containing ammonia solution was passed through a gas scrubbing train containing $ZnCl_2$ to determine if $H_2S$ gas was being evolved. None was detected. Lastly, the carbon which had undergone three leaching steps with ammonia was analyzed by LECO for total sulfur, and by carbon disulfide extraction for elemental sulfur.

From the results of leaching the 60 g (136 cc) carbon sample three times with liquid ammonia (250 cc per stage), it was observed that 7.26 g of sulfur reported to the ammonia leachate and leached carbon products, out of a total of 7.56 g of sulfur in the reactor feed. Thus, about 96 pct of the sulfur was accounted for. About 47 pct of the total sulfur was recovered in the first ammonia leaching stage, and the total sulfur recovery after three leaching stages was 68.2 pct. The results of this leaching test showed that essentially all of the sulfur could be accounted for in the leachate and leached carbon products, and that the method of the present invention could be used successfully to desulfurize sulfer-laden solid catalysts.

Another important aspect of the present invention is that the sulfur-laden solid catalyst used in the desulfurizing process can be recycled after desulfurization. This aspect of the invention was tested using carbon samples from several ammonia leaching tests. The various samples were combined into one large sample totalling about 60 g. This sample was releached with liquid ammonia, and then a 40 gram split was used for a sulfur reloading test using a carbon column apparatus. The remaining 20 gram split was also analyzed for sulfur content.

The analysis of the carbon indicated that sulfur loading was basically unaffected by leaching once with ammonia. The carbon sample which contained 6.15 pct sulfur before leaching was able to reload to a sulfur level of 6.6 percent after leaching had taken place. The twice-leached sample reloaded to a level of 7.4 percent sulfur, only slightly less than the 7.8 percent level of sulfur loading originally achieved before treatment with ammonia. It is thus clear that the carbon catalysts useful in the present invention are recyclable for further use after the desulfurization has been carried out.

The method of the present invention is clearly useful in the fertilizer industry where phosphogypsum is produced in mass quantities, and where it is desirable to recycle the sulfur in that industry. The utility of this invention further extends to any industry involving gypsum or sulfur. The power generation industries using flue gas desulfurization are prime candiates for use of this invention. The desulfurization process produces vast stockpiles of byproduct gypsum, which would be available for conversion to sulfur. The invention would also find application to other byproduct gypsums and to natural gypsum. The utility and field of application of this invention would also apply to the petroleum industry which removes hydrogen sulfide from natural gas and petroleum products. The elemental sulfur produced from the hydrogen sulfide could thus be extracted by application of this invention.

The following examples are presented to further illustrate the various aspects of the present invention and should not be construed as limiting the scope of the invention in any way.

EXAMPLE I

Ten-gram batch leaching tests were carried out to test the potential of liquid anhydrous ammonia for leaching sulfur from a solid catalyst. The experiments were carried out using a 1½ in. diameter by 13¾ in. long laboratory-scale reactor in which liquid ammonia could be contacted with activated carbon (Calgon Filtrasorb 400) that had been previously loaded with sulfur. The carbon was loaded with sulfur by placing it in a small laboratory column and concurrently flowing $NH_4SH$ solution and air through the column. The laboratory scale reactor used for the 10-gram batch leaching tests was constructed from a carbon steel pipe.

The general test procedure was as follows:
1. A 10 to 11 g charge of sulfur-loaded carbon was placed in the pipe reactor which was then sealed and pre-chilled in a dry ice/acetone bath (about −50° C.).
2. The reactor was removed from the bath, opened, and a predetermined volume of liquid anhydrous ammonia (25–250 mL) was poured into the reactor. The reactor was quickly resealed, shaken, and then placed horizontally in a water-ice bath at 0° C.
3. The reactor was agitated vigorously for 30 seconds every 5 minutes for a predetermined period of time (10–60 minutes). During this time period, the cylinder was allowed to warm up from −50° C. to near 0° C., thus passing through the −11.5° C. temperature required for dissolution of rhombic sulfur.
4. The reactor was removed from the ice bath and then chilled in the dry ice/acetone bath to reduce the ammonia vapor pressure to less than atmospheric.
5. The reactor was positioned vertically and the discharge valve was opened slowly, allowing the sulfur-laden liquid ammonia to flow into a beaker. The volume of ammonia recovered was noted to be about 25 mL less than the feed volume for each test.
6. After discharge of the ammonia from the reactor, with resulting pressure letdown, the leached carbon was removed from the reactor for subsequent analyses.
7. The sulfur-laden ammonia was allowed to evaporate in a beaker under ambient conditions to produce a sulfur product which was then refined using carbon disulfide to detemine the actual amount of sulfur extracted from the carbon.

The results of the 10-gram tests are summarized in Table 1. The results indicated that liquid ammonia was a suitable solvent for leaching sulfur from carbon. Recoveries of sulfur on the order of 75 percent were obtained with leaching times of about 20 minutes. The volume of ammonia used for the leaching had little influence on overall sulfur recovery, probably because the sulfur is so highly soluble in ammonia, up to 30–40 wt. pct., according to Ruff and Hecht (*Lange's Handbook of Chemistry*, 11th ed., pp. 10–23 (1976)).

TABLE 1

Recovery of Elemental Sulfur From Sulfur-Loaded Carbon as a Function of Leach Time and Ammonia Volume.

| Test No. | Leach Time Minutes | $NH_3$ Vol., CC | S Residue g S/10 g C | S. Recovery % |
|---|---|---|---|---|
| 4 | 10 | 100 | 0.320 | 41.0 |
| 8 | 10 | 250 | 0.359 | 46.0 |
| 11 | 10 | 50 | 0.271 | 34.7 |
| 6 | 20 | 100 | 0.570 | 73.0 |
| 7 | 20 | 250 | 0.511 | 65.5 |
| 12 | 20 | 50 | 0.486 | 62.3 |
| 9 | 40 | 100 | 0.543 | 69.6 |
| 10 | 40 | 250 | 0.475 | 60.9 |
| 5 | 60 | 100 | 0.448 | 57.4 |
| 13 | 60 | 50 | 0.587 | 75.3 |

Notes:
Recovery is based on carbon disulfide extraction of the sulfur residue remaining after evaporation of the S/Ammonia leach liquor. Recoveries have been corrected for hold-up losses in the reactor and for minor differences in the weight of carbon used in several tests. (11.0 vs 10.0 g).

EXAMPLE II

A sixty-gram batch leaching test was carried out on activated carbon that had been loaded with sulfur from oxidation of ammonium bisulfide reagent. The total sulfur content as determined by LECO analysis after loading was 13.4 percent. Since the inherent sulfur in the as-received carbon was 0.8 pct. sulfur, the actual sulfur loading, or "potentially recoverable sulfur" on the carbon due to $NH_4SH$ conversion was 13.4−0.8 or 12.6 percent sulfur.

The test was carried out as follows:

Sixty grams of activated carbon (136 cc) was placed in the stainless steel pipe reactor. The reactor was then pre-chilled to −50° C. in the acetone/dry ice bath for several minutes. The reactor was then opened and 250 mL of liquid $NH_3$ was added. The reactor was closed, placed in an ice-water bath for 20 minutes and was shaken vigorously every 5 minutes. At the end of the leach, the reactor was again chilled to −50° C., and the sulfur-containing ammonia solution was discharged into a 250 mL volumetric flask and weighed. The reactor was rechilled to −50° C. and 250 mL of liquid $NH_3$ was added and the carrbon was re-leached for another 20 minutes in the water bath. At the end of this second leach, the second sulfur-containing ammonia solution was collected, and a third re-leaching was carried out using the same procedure. Each of the three sulfur/ammonia solutions were allowed to evaporate and the amount of sulfur contained in each evaporite was determined by carbon disulfide extraction. Also, the ammonia gas produced during evaporation of the first sulfur-containing ammonia solution was passed through a gas scrubbing train containing $ZnCl_2$ to determine if $H_2S$ gas was being evolved. None was detected. Lastly, the carbon which had undergone three leaching steps with ammonia was analyzed by LECO for total sulfur, and by carbon disulfide extraction for elemental sulfur.

The results of repeatedly leaching the 60 g (136 cc) carbon sample three times with liquid ammonia (250 cc per stage) are summarized in Table 2. Closure of the sulfur mass balance was excellent. From the data it is seen that 7.26 g of sulfur reported to the ammonia leachate and leached carbon products, out of a total of 7.56 g of sulfur in the reactor feed. Thus, about 96 pct of the sulfur was accounted for. About 47 pct of the total sulfur was recovered in the first ammonia leaching stage, and the total sulfur recovery after three leaching stages was 68.2 pct. The results of this leaching test showed that essentially all of the sulfur could be accounted for in the leachate and leached carbon products.

TABLE 2

Recovery of Elemental Sulfur from Sulfur-Loaded Carbon Using Three Stages of Ammonia Leaching.

| Product | Grams Sulfur | Percent Sulfur Individual | Percent Sulfur Cumulative |
|---|---|---|---|
| 1st Leach | 3.55 | 46.9 | 46.9 |
| 2nd Leach | 1.19 | 15.7 | 62.6 |
| 3rd Leach | 0.42 | 5.6 | 68.2 |
| Leached Carbon | 2.10 | 27.8 | 96.0 |
| Sulfur Loss | 0.30 | 4.0 | 100.0 |
| Total | 7.56 | 100.0 | |

Notes:
250 mL $NH_3$/136 cc carbon per stage (Bulk Density of carbon - 0.44 gm/cc) Sulfur in leach products by $CS_2$ extraction Sulfur in Loaded Carbon and Leached Carbon by LECO Total Sulfur.

EXAMPLE III

A screening test was undertaken to determine if the carbon used in the process of the present invention had the potential for recycling to the sulfur-loading stage after sulfur had been leached from it using liquid ammonia. This test was carried out as follows:

Carbon samples from several ammonia leaching tests were combined into one large sample totalling 60 g. This sample was then releached with 250 mL liquid ammonia for 20 minutes. A 40 g split of the releached carbon was used for a sulfur reloading test using the carbon column apparatus described above in Example I; the remainder was analyzed for sulfur using both carbon disulfide extraction and LECO Total Sulfur Analysis. The carbon column reloading test was done using the same basic technique used in the original loading. The results are summarized in Table 3.

The carbon which had been subjected twice to leaching by anhydrous ammonia, was reloaded to a sulfur content of 7.4 pct sulfur, only slightly less than the 7.8 pct sulfur loading of the original as-received activated carbon. The comparison of the $CS_2$ extraction before leaching (6.15 pct sulfur) and after leaching and reloading (6.6 pct sulfur) is favorable. Thus it appears that, for at least one complete duty cycle, the carbon responds well. It would also appear that the carbon catalysts used in the present invention can be recycled more than once without significant impairment of their role in catalyzing sulfide oxidation.

TABLE 3

Carbon Recycle Tests.

| | Dry Wt. g | $CS_2$ % S | LECO[1] % S |
|---|---|---|---|
| Loaded Carbon before 1st ammonia leach | — | 6.15 | 7.8 |
| Carbon after 2nd ammonia Leach | 40.0 | 0.292 | 3.6 |
| Leached Carbon after reloading w/S using $NH_4SH$ | 45.2 | 6.6 | 7.4 |

[1]Corrected for 0.8 pct inherent S in as-received carbon.

What is claimed is:

1. A method of recovering sulfur from a solid sulfur-containing catalyst comprising the steps of contacting the catalyst with anhydrous liquid ammonia at a temperature ranging from about −11.5° C. to about 40° C. and at pressures ranging from about 40 psi to about 250 psi so as to leach the sulfur from the catalyst and form an ammonia-sulfur solution, separating the catalyst from the ammonia-sulfur solution, and separating the ammonia from the ammonia-sulfur solution to obtain the sulfur product.

2. A method according to claim 1 wherein the ammonia is separated from the ammonia-sulfur solution by evaporation.

3. A method according to claim 1 wherein the solid sulfur-containing catalyst is activated carbon.

4. A method according to claim 1 wherein the catalyst is separated from the ammonia-sulfur solution by filtration.

5. A method according to claim 1 wherein the step of contacting the catalyst with liquid ammonia is carried out at temperatures from about −11.5° C. to about 10° C., and wherein the step of separation of ammonia from the ammonia - sulfur solution is carried out by heating the solution to a temperature of at least about 100° C.

6. A method according to claim 1 wherein the ammonia is recovered and reused.

7. A method of recovering sulfur from a solid sulfur-containing material comprising the steps of contacting the solid material with anhydrous liquid ammonia at a temperature ranging from about −11.5° C. to about 40° C. and at pressures ranging from about 40 psi to about 250 psi so as to dissolve the sulfur in the solid material and form an ammonia-sulfur solution, separating the solid material from the ammonia-sulfur solution, and separating the ammonia from the ammonia-sulfur solution to obtain the sulfur product.

8. A method according to claim 7 wherein the solid sulfur-containing material is lead sulfide.

9. A method according to claim 1 wherein the ammonia is separated from the ammonia-sulfur solution to obtain the sulfur product in an enclosed reactor by heating the ammonia-sulfur solution to about 100° C. to precipitate out the sulfur product.

* * * * *